United States Patent [19]

de Man et al.

[11] 4,412,051

[45] Oct. 25, 1983

[54] BROMINE-CONTAINING POLYMER AND PROCESS OF PREPARING A BROMINE-CONTAINING POLYMER

[75] Inventors: Hendrikus C. J. de Man, Geleen; Petrus T. J. L. Smids, Maastricht, both of Netherlands

[73] Assignee: Stamicarbon B.V., Geleen, Netherlands

[21] Appl. No.: 285,511

[22] Filed: Jul. 21, 1981

Related U.S. Application Data

[63] Continuation of Ser. No. 100,329, Dec. 5, 1979, abandoned.

[30] Foreign Application Priority Data

Dec. 22, 1978 [NL] Netherlands .......................... 7812460

[51] Int. Cl.³ ............................................ C08F 12/16
[52] U.S. Cl. .................................... 526/293; 526/271
[58] Field of Search ...................... 526/271, 293, 292.7

[56] References Cited

U.S. PATENT DOCUMENTS

| | | | |
|---|---|---|---|
| 2,846,424 | 8/1958 | Mino et al. | 526/293 |
| 3,214,496 | 10/1965 | Harris | 526/293 |
| 3,489,737 | 1/1970 | Natta | 526/293 |
| 3,534,012 | 10/1970 | Dennis . | |
| 3,959,398 | 5/1976 | Jalics | 526/293 |
| 4,051,311 | 9/1977 | Lee | 526/271 |
| 4,170,699 | 10/1979 | Wright . | |
| 4,178,327 | 12/1979 | Hall | 526/293 |

FOREIGN PATENT DOCUMENTS 880338 10/1961 United Kingdom .

*Primary Examiner*—Paul R. Michl

[57] ABSTRACT

Fire-resistant copolymers of bromostyrene and another monomer, preferably acrylonitrile, are made by emulsion polymerization to produce copolymers having 95 to 25 weight percent bromostyrene, the balance being the second monomer. The resulting copolymers have a high bromine content in the range 20 to 44 weight percent and may be used as such as a flame-resistant plastics material or admixed with other plastics such as the polyolefins to impart fire-resistance to the mixture. The copolymers produced exhibit good mechanical properties and fire-resistance values.

8 Claims, No Drawings

BROMINE-CONTAINING POLYMER AND PROCESS OF PREPARING A BROMINE-CONTAINING POLYMER

CROSS REFERENCE TO RELATED APPLICATIONS

This is a continuation of our earlier application Ser. No. 100,329 filed Dec. 5, 1979, and now abandoned.

BACKGROUND OF THE INVENTION

The present invention relates to bromine-containing polymers and to a process of preparing these bromine-containing polymers.

In all kind of plastics applications, the plastics used are often required to have flame-retarding properties. This applies in particular where plastics are used in articles such as domestic appliances, in the automotive industry, and where plastics are used as building materials.

The usual method by which flame-retarding properties are imparted to the plastics is the blending-in of flame retardants and most of these flame retardants contain bromine, for example brominated diphenyl or diphenyloxide compounds. Together with antimony trioxide these flame retardants impart good flame-retarding properties to the plastics when included in the plastics mixture by blending.

However, these flame retardants have a major disadvantage in that the incorporation of these flame retardants and the processing of the plastics incorporating brominated flame retardants gives rise to problems and specifically that the flame retardant or decomposition products thereof may be released. The can cause an offensive odor and, in addition, it is possible in certain cases for noxious compounds to be released. In addition, these included flame retardants considerably affect the mechanical properties of the plastics in which they are contained.

Many proposals have been made to overcome such difficulties. A large number of proposals simply amount to the replacement of the brominated compounds with compounds containing nitrogen and/or phosphorus which are similarly blended in the plastic. Although in processing these compounds may give fewer problems than the bromine-containing flame retardants, for the most part they also have the disadvantage of adversely influencing the mechanical properties of the plastics.

The object of the present invention is to provide a plastic which, on the one hand, possesses flame-retarding properties by itself and can be used as such, and, on the other hand, can be conveniently blended with other plastics in the same manner as a flame retardant.

DETAILED DETAILED DESCRIPTION OF THE INVENTION

According to one aspect of the present invention, the bromine-containing polymer is disclosed which is composed of from 95 to 25% by weight of bromostyrene and from 5-75% by weight of one or more other monomers.

The other monomers used are preferably α-methylstyrene, acrylonitrile, methacrylonitrile, maleic acid anhydride, vinylacetate or halogenated and non-halogenated esters of acrylic acid and/or methacrylic acid, for instance dibromopropylacrylate. In a preferred composition the polymer is composed of 95 to 60% by weight of bromostyrene and 5 to 40% by weight of acrylonitrile.

The term bromostyrene as used herein is to be understood as including styrene and alkyl-substituted styrene with bromine substitution in the phenyl nucleus, such as ortho-, meta- and parabromostyrene, and styrene with multiple bromine substitution, or mixtures of these styrene with multiple bromine substitution, or mixtures of these bromine-containing compounds.

The polymers according to the present invention exhibit flame retarding properties by themselves, and, optionally after the addition of small amounts of one or more metal oxides, such as antimony trioxide, may be classified V-O at a thickness of 1.6 mm in the Underwriters Laboratory test (UL 94).

The bromine-containing polymers preferably have a weight-average molecular weight of between 25,000 and 2,000,000, and preferably between about 50,000 and about 500,000.

The viscosity $\eta_{0.1}$ of the polymers according to the present invention is preferably between 0.05 and 5. The value of $\eta_{0.1}$ as used herein indicates the relative viscosity at a concentration of 0.1 g/dl, divided by the concentration in g/dl, measured in dimethylformamide at 20.0° C.

The bromine content of the polymer depends on the end use to which the polymer composition is to be placed. If the polymer is to be used as such, that is without the addition of flame retardant materials, its bromine content may be lower than if the polymer is to be used as flame retardant in other plastics while still maintaining the desired flame retardant properties. When used as an addition for its flame retardant properties the bromine content of the bromine-containing copolymer is preferably between 20 and 44% by weight. The product according to the present invention is most suited for replacing conventional bromine-containing flame retardants such as brominated diphenyl compounds or brominated diphenyloxide compounds in various plastics which include polyolefins, notably high and low density polyethylene, polypropylene, block- and co-polymers of ethylene and propylene, and polybutylene, and mixtures thereof. Further, the bromine-containing copolymer also can be advantageously used in polystyrene, copolymers of styrene and butadiene, styrene and acrylonitrile, in rubber-modified polystyrene, and in ABS.

In many cases it may be desirable to add one or more inorganic compounds, such as antimony trioxide, in order to further improve the flame retarding properties.

According to the process aspect of the present invention the bromine-containing copolymers can be prepared in various ways. The polymerization processes employed may be analogous to the known processes used for styrene homopolymers and copolymers, taking into account differences in reactivity that may exist. Examples of known types of polymerization processes include bulk, solution, suspension, emulsion and precipitation polymerization, and mixed forms thereof. These processes may be continuous, semi-continuous or batch processes.

A preferred mode of conducting a process for the preparation of bromine-containing polymers is characterized in that 25–100 parts by weight of bromostyrene are added, continuously or batch-wise, to an aqueous emulsion of 5–40 parts by weight of acrylonitrile, up to 25 parts by weight of one or more monomers such as α-methylstyrene, maleic acid anhydride, vinylacetate and esters of acrylic acid and/or methacrylic acid, up to 25 parts by weight of bromostyrene, and a small quantity of emulsifier, in the presence of a compound providing water-soluble free radicals to the polymerization reaction mixture, and, optionally, in the presence of a chain-transfer agent. Upon completion of the polymerization reaction 60–95% by weight of copolymerized bromostyrene is present in the resulting polymer.

Another preferred mode of preparing a bromine-containing polymer is characterized in that (1) an emulsion is prepared which contains 5–40 parts by weight of acrylonitrile, 60–95 parts by weight of bromostyrene, optionally up to 25 parts by weight of one or more other monomers, a compound yielding free radicals, an emulsifier, and, optionally, a chain transfer agent. (2) A portion say 10 to 40% of this emulsion is raised to the reaction temperature in a suitable reactor, and (3) the remaining portion of the emulsion is supplied to the reactor at a rate lower than that at which the polymer is formed.

In certain cases it may be preferable to prepare the copolymer of acrylonitrile and bromostyrene by copolymerizing equimolar amounts of acrylonitrile and bromostyrene in the present of a compound such as zinc chloride.

Suitable emulsifiers, free-radical initiators and chain-transfer agents for the process of the present invention are well known in the art of styrene polymerization. Examples of emulsifiers are rosin wood soap ((salt of) disproportionated abiteinic acid), metal soaps of fatty acids, alkyl sulfates and sulfonates.

The compounds yielding water-soluble free radicals are, themselves, often completely water-soluble. Examples are potassium persulphate and ammonium persulphate. But also compounds which are not completely water-soluble but yield water-soluble free radicals can be applied with very good results. Examples are the tert.-butyl-per compounds, like di-tert. butyl peroxide, di-tert. butylperoxydicarbonate, tert. butyl peracetate, tert. butyl perpivalate, tert. butyl perbenzoate, and tert. butyl hydroperoxide. These compounds are particularly preferable because very stable latices are obtained. This is of impartance during transportation and storage of the latices. Further, also compounds which are not completely water-soluble and which form part of a redox system that yields water-soluble free radicals can be applied.

Examples of compounds of this kind are cumene hydroperoxide, diisopropyl benzene hydroperoxide, triisopropyl benzine hydroperoxide, tert. butyl isopropyl benzene hydroperoxide and dodecyl isopropyl benzene hydroperoxide.

A specific example of a chain transfer agent is the class of mercaptans of which n-octyl mercaptan and tertiary dodecylmercaptan are typical examples.

Generally the reaction temperature is determined by the initiator chosen. However a suitable temperature range is from 50° C. to 120° C., by preference 55°–95° C.

The present invention will now be further illustrated by way of the following examples which are provided by way of additional description and without limitation.

EXAMPLES OF THE INVENTION

EXAMPLE I–V

In these examples five different bromostyrene/acrylonitrile copolymers were formed using different reactants but generally the same reaction conditions. In these examples one quarter of an amount of an aqueous emulsion of bromostyrene and acrylonitrile, having the composition indicated in Table 1, was introduced into a polymerization reactor. The reactor was a pressure vessel suitable for batch-emulsion polymerization and provided with baffles and a stirrer. The reactor contents were heated to 75° C. while being stirred, at which temperature the polymerization reaction started. The rest of the emulsion was supplied continuously at a rate such that the supply was completed in one hour. After the supply has stopped, the reaction was continued for 2 hours while at a temperature of 75° C.

A latex resulted and was then coagulated with sulfuric acid, separated out by filtration, washed with water, and dried.

TABLE 1

| Example | BS (g) | ACN (g) | Water (g) | Em. (g) | PPS (g) | TDDM (g) |
|---------|--------|---------|-----------|---------|---------|----------|
| I | 91.5 | 26.5 | 294 | 2.36 | 0.24 | — |
| II | 91.5 | 57.4 | 294 | 2.36 | 0.24 | — |
| III | 91.5 | 57.4 | 294 | 2.36 | 0.24 | — |
| IV | 91.5 | 57.4 | 294 | 2.36 | 0.24 | 1.54 |
| V | 91.5 | 57.4 | 294 | 2.36 | 0.24 | 0.77 |

BS = bromostyrene
ACN = acrylonitrile
Em. = emulsifier (rosin wood soap)
PPS = potassium persulphate, the initiator
TDDM = tertiary dodecylmercaptan, the chain transfer agent Table 2 shows the characteristics of the resulting products.

TABLE 2

| Example | behavior in fire* | bromine (%) | $\eta_{0.1}$ (dl/g) | spec. gravity (kg/m$^3$) |
|---------|-------------------|-------------|---------------------|--------------------------|
| I | VO | 36.9 | 1.54 | 1530 |
| II | VO | 32.3 | 2.14 | 1480 |
| III | VO | 32.4 | 2.15 | 1490 |
| IV | VO | 32.0 | 0.44 | 1470 |
| V | VO | 32.6 | 0.61 | 1470 |

*at 1.6 mm according to UL test 94
(VO = a pass rating)

What is claimed is:

1. A process of preparing a bromine-containing copolymer comprising adding 25 to 100 parts by weight of bromostyrene, continuously or in batches, to an aqueous emulsion of 5 to 40 parts by weight of acrylonitrile, and an emulsifier, conducting the polymerization reaction in the presence of an initiator providing water-soluble free radicals and after completion of the polymerization yielding a copolymer product having 60 to 95% by weight of copolymerized bromostyrene therein and having a weight-average molecular weight in the range of 25,000 to 2,000,000.

2. The process as claimed in claim 1 wherein a chain transfer agent is present in the polymerization reaction mixture.

3. A process of preparing a bromine-containing copolymer comprising
   (1) preparing an emulsion containing 5 to 40 parts by weight of acrylonitrile, 60 to 95 parts by weight of bromostyrene, an initiator providing water-soluble free radicals and an emulsifier;
   (2) heating from about 10 to about 40% of the emulsion of step (1) to the reaction temperature in a polymerization reactor, and thereafter
   (3) polymerizing the remaining portion of the emulsion while supplying same to the reactor at a rate lower than that at which said polymer is formed; and (4) recovering the bromine-containing copolymer thus formed, the resulting copolymer having a weight-average molecular weight in the range of 25,000 to 2,000,000.

4. The process as claimed in claim 3 wherein a chain transfer agent is present in the polymerization reaction mixture.

5. The process as claimed in claim 1 wherein the polymerization is conducted at a temperature in the range of about 50° C. to about 120° C.

6. The process as claimed in claim 5 wherein the polymerization is conducted at a temperature in the range of about 55° C. to about 95° C.

7. The process as claimed in claim 3 wherein the polymerization is conducted at a temperature in the range of about 50° C. to about 120° C.

8. The process as claimed in claim 7 wherein the polymerization is conducted at a temperature in the range of about 55° C. to about 95° C.

* * * * *